Jan. 3, 1950 W. M. CASSIDY 2,493,225
JAR SEALER
Filed May 27, 1948 2 Sheets-Sheet 1

William M. Cassidy
INVENTOR.

BY *Lawrence A. O'Brien*
*and Harvey B. Jacobson*
Attorneys

Jan. 3, 1950 W. M. CASSIDY 2,493,225
JAR SEALER
Filed May 27, 1948 2 Sheets-Sheet 2

William M. Cassidy
INVENTOR.

BY *[signatures]*
Attorneys

Patented Jan. 3, 1950

2,493,225

UNITED STATES PATENT OFFICE 2,493,225

JAR SEALER

William M. Cassidy, Madison, Maine

Application May 27, 1948, Serial No. 29,557

3 Claims. (Cl. 226—84)

This invention relates to improvements in devices for sealing jars, and a primary object of the invention is to provide a device that will quickly and effectively close jars containing food that is being packed without the possibility of scalding or burning the canner.

Another object of the invention is to provide means for both sealing a jar and supplying the lift support whereby the jar is removed from the canning bath and placed in cooling position without burning the person using the device by the steam or the heated condition of the jar.

Another object of the invention is to provide a device that is simple and durable in construction, economical and effective for the intended use.

Other objects and advantages will become apparent during the course of the following description.

In the accompanying drawings forming a part of this specification, and wherein like characters of reference denote like parts throughout, Figure 1 is a side elevation of the invention in position on a jar top with the jar bail in raised position;

In cooking fruits or vegetables in jars for preservation for future use, the top or cover is not generally closed tightly during the cooking operation, because it is necessary to enable air to escape. The filled jars are placed in cool or lukewarm water in the canner with the water covering the jars and brought to the boiling point and cooked under boiling conditions from one to two and one-half hours. The rubber and glass top are loosely in position. At the end of the processing time, the jar clamp or second bail is pushed down with the jar still under boiling water to fully seal the jars, after which they are removed or permitted to process for a short while longer. Thus, it is necessary for the operator to close the lid while the jars are extremely hot, and as a result scalding frequently occurs, the chances of such accident being further enhanced by the emission of steam from the canner. In order to avoid such difficulties, the instant invention has been devised.

Referring to the figures, the invention is illustrated in position on a canning jar and is identified generally by numeral 10. Sealer 10 consists of a jar engaging member 12 and a sealing member 14.

Figure 3:
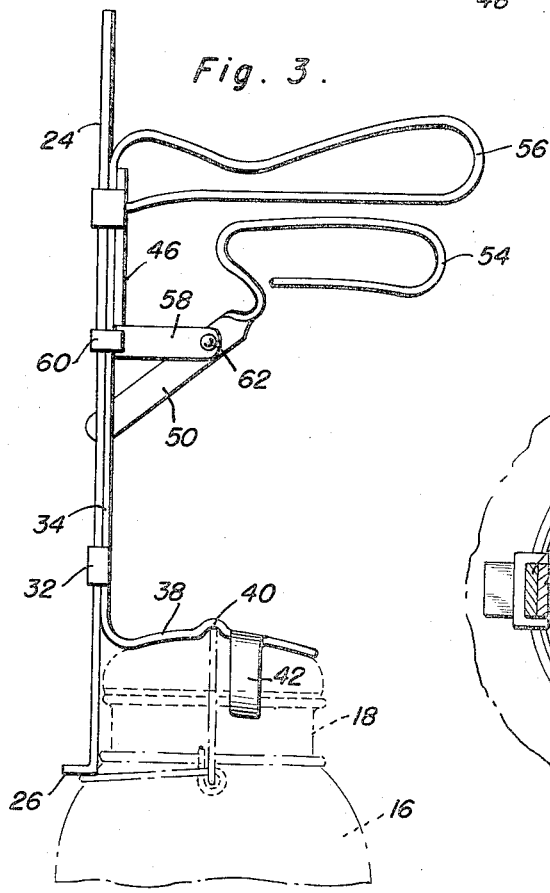
Figure 3 is a side elevational view of the invention similar to that illustrated in Figure 1, with the jar bail in closed position.

The jar engaging member 12 serves the additional function of actuating sealing member 14 whereby a jar being processed is closed. As is clearly illustrated in Figure 1 in dotted lines, a canning jar 16 of usual construction contains a lid or cover 18 thereon, with a first bail 20 engaging the top of lid 18, with a sealing bail 22 secured to bail 20 and illustrated in raised position, in a manner well known. Sealing member 14 is constructed of a substantially elongated flat bar or shank 24 terminating at one end thereof in a short lateral flange 26. Sealing member 24 is so constructed at 28, the point where flange 26 and shank 24 join, that it assists in fastening on bail 22 and also retaining the device on jar 16 when in closed position, as illustrated in Figure 3.

Figure 6:
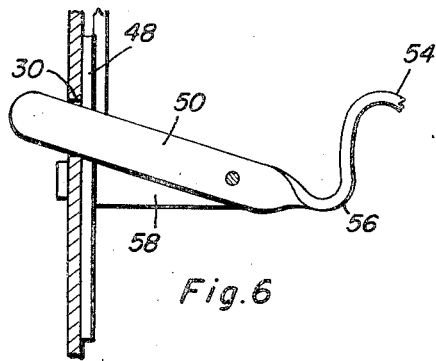
Figure 6 is a fragmentary enlarged view of the means for actuating the device and is taken substantially on lines 6—6 of Figure 2.

As is readily seen in Figure 6, shank 24 is slotted at 30 approximately medially the length thereof for a purpose presently to appear.

Figure 4:
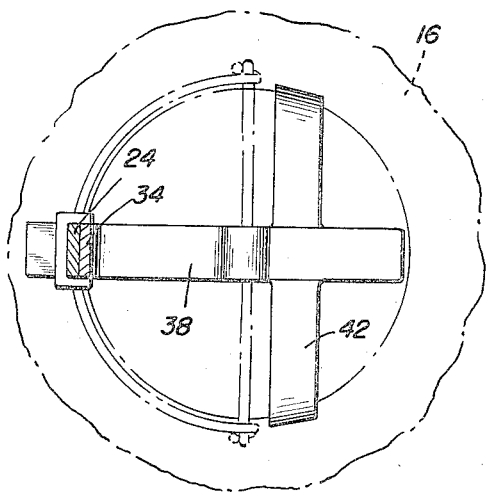
Figure 4 is a horizontal view of the jar gripping means and is taken substantially on lines 4—4 of Figure 1.
Figure 7:
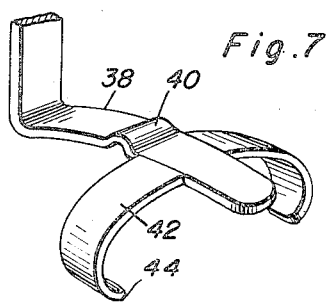
Figure 7 is a fragmentary perspective view of the jar top gripping means.

Jar gripping member 12 is slidably connected with sealing member 14 by means of arcuate sleeves 32 welded thereto and slidably receiving shank 24. Member 12 includes a flat longitudinal leg or shank member 34, of somewhat shorter length than bar 24, although of identical width. Leg 34 terminates at the rear free end thereof in a hand-gripping handle 36, employed in the actuation of the device. The opposite extremity of leg 34 is bent at substantially right angles thereto, as is best illustrated in Figures 4 and 7, and contains an intermediate raised portion 40 to provide clearance for bail 20. A pair of laterally extending gripping fingers 42 are integrally secured with the free end of lateral leg 38 at a point adjacent member 40 and terminate in inturned edges 44 adapted to seat below the rim of jar 16, in the manner illustrated in the figures. Thus, the device is pressed down upon lid 18 and fingers 42 are of sufficiently resilient construction to slide under the rim of the jar and retain the lid thereon in closed position.

Figure 5:
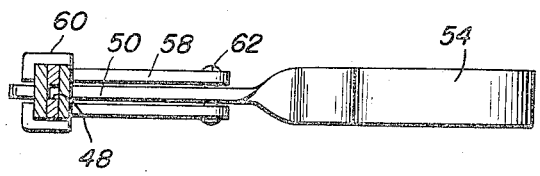
Figure 5 is a horizontal view of the closing means and is taken substantially on the lines 5—5 of Figure 1.

A reinforcing bar 46 is secured to member 34 for strengthening purposes. Leg 34 contains a substantially elongated slot 48 medially the length thereof and receives therethrough an actuating lever 50. Lever 50 is of flat construction and extends through slot 48 and slot 30. The free end 52 of lever 50 is slightly rounded for ease of clearance in the slot. The opposite end of lever 50 is integral with an actuating trigger 54 by means of a twisted connecting link 56. Lever 50 is mounted for pivoted movement, as may be seen in Figure 5, between parallel links 58 secured by ears 60 to shank 24 and to lever 50 by transverse pivot pin 62.

Figure 1:
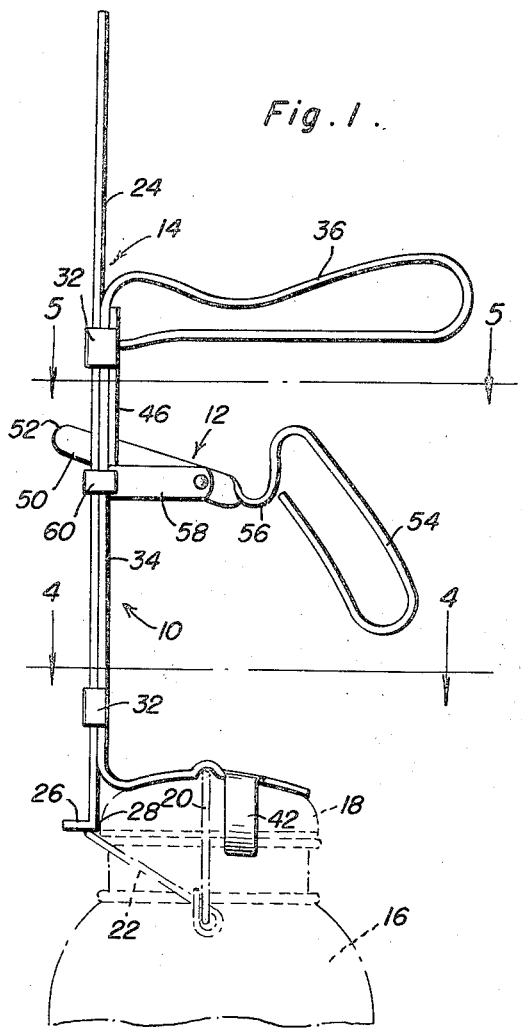
Figure 2:
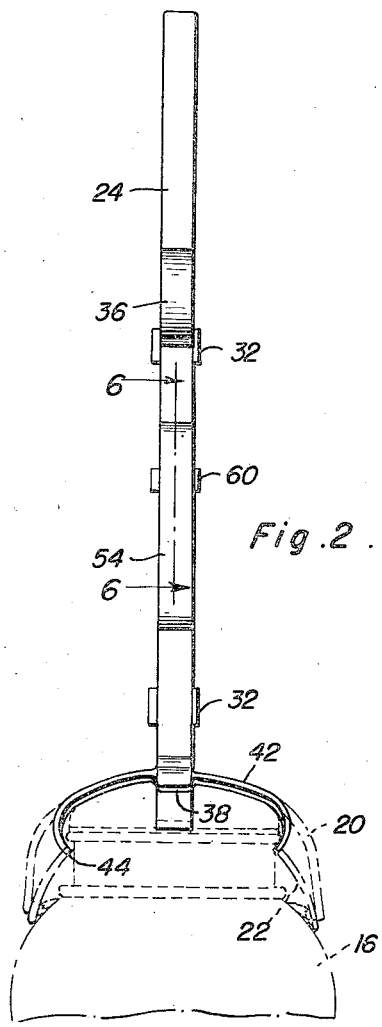
Figure 2 is a front elevation of the device shown in Figure 1 and is taken at right angles thereto.

In use, the device is placed in position on a jar 16, in the manner illustrated in Figure 1. Thus, fingers 42 retain lid 18 in closed position on jar 16, while flange 26 rests on bail 22 in its open position. Handle 36 is grasped by the operator and trigger 54 is pulled, thereby causing lever 50 to pivot in links 58, continued movement of lever 50 sliding shank 24 downward upon bail 22 until it has assumed the clamped position illustrated in Figure 3. Jar 16 is now retained by fingers 42 and the close engagement of the lower end of shank 24. The jar may now be removed from the canning bath and placed in position to cool, the operator avoiding any possibility of scalding or burning.

Any suitable material may be employed in the construction of the device. From the above, it will be seen that the various objects of the invention have been attained. While a preferred embodiment of the invention has been shown and described, it is to be understood that various changes in size, shape and arrangement of parts may be made without departing from the spirit of the invention or the scope of the appended claims.

Having described the invention, what is claimed as new is:

1. In a jar having a lid and a sealing bail therefor, a sealing device consisting of a jar lid engaging member, a jar sealing member slidably retained on said lid engaging member, pivoted means extending through said members for actuating said sealing member, and means to operate said pivoted means, said sealing member consisting of a shank, a slot in said shank and a lateral flange on said shank, said flange engaging the bail of a jar to clamp it in sealing position when said shank member is moved downward.

2. A jar sealing device consisting of a jar lid engaging member, a jar sealing member slidably retained on said lid engaging member, slots in said members, a lever extending through said slots, a trigger secured to said lever, and links secured to said lid engaging member and lever for pivoted movement of said lever in said slots to slide said sealing member downwardly into clamping position.

3. The combination of claim 2 wherein said lid engaging member includes a longitudinal leg, a handle at one end thereof, a lateral leg at the other end, said lateral leg including fingers engaging a jar lid and rim to retain them in sealing engagement.

WILLIAM M. CASSIDY.

REFERENCES CITED

The following references are of record in the file of this patent:

UNITED STATES PATENTS

| Number | Name | Date |
|---|---|---|
| 1,801,381 | Walmsley | Apr. 21, 1931 |